(12) United States Patent
Ravindranath et al.

(10) Patent No.: US 12,254,344 B2
(45) Date of Patent: Mar. 18, 2025

(54) METHOD AND SYSTEM FOR AUTOMATED REFACTORING OF MAINFRAME BASED BATCH SYSTEMS TO CLOUD NATIVE ENVIRONMENT

(71) Applicant: Tata Consultancy Services Limited, Mumbai (IN)

(72) Inventors: Yogananda Ravindranath, Chennai (IN); Tamildurai Mehalingam, Chennai (IN); Karthick Periyasamy, Chennai (IN); Rama Rangarajan, Chennai (IN); Mounica Thamatam Reddy, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 473 days.

(21) Appl. No.: 17/743,546

(22) Filed: May 13, 2022

(65) Prior Publication Data

US 2023/0053645 A1  Feb. 23, 2023

(30) Foreign Application Priority Data

Jul. 22, 2021 (IN) .............................. 202121033042

(51) Int. Cl.
G06F 9/48 (2006.01)
G06F 9/445 (2018.01)

(52) U.S. Cl.
CPC ........ G06F 9/4843 (2013.01); G06F 9/44505 (2013.01)

(58) Field of Classification Search
None
See application file for complete search history.

(56) References Cited

U.S. PATENT DOCUMENTS

| | | | |
|---|---|---|---|
| 10,162,610 B2 | 12/2018 | Apte et al. | |
| 2018/0218165 A1* | 8/2018 | Mei | G06F 16/1774 |
| 2020/0314169 A1* | 10/2020 | Camargo | H04L 67/10 |

FOREIGN PATENT DOCUMENTS

IN  202021008655  2/2021

* cited by examiner

Primary Examiner — Adam Lee
(74) Attorney, Agent, or Firm — Finnegan, Henderson, Farabow, Garrett & Dunner, LLP

(57) ABSTRACT

A Mainframe batch system have various type of source components and each component has its own purpose and functionality within the environment. Existing refactoring are still dependent on manual skills and competency. A method and system for automated refactoring of mainframe based batch systems to cloud native environment is provided. The present disclosure proposes an intelligent automation model that comprehends every aspect of the existing Mainframe batch system, all its inherent source elements along with its dependencies. With this holistic understanding of all the elements of the Mainframe batch system, the system converts the information within them into a proprietary conceptual model. This model has all the information about the source elements is converted into the target architecture which is cloud native. The combination of the model with the externalizable command based templates (EBCT) aligns the conversion to any target technology feasible.

15 Claims, 4 Drawing Sheets

METHOD AND SYSTEM FOR AUTOMATED REFACTORING OF MAINFRAME BASED BATCH SYSTEMS TO CLOUD NATIVE ENVIRONMENT

PRIORITY CLAIM

This U.S. patent application claims priority under 35 U.S.C. § 119 to: Indian Patent Application No. 202121033042 filed on 22 Jul. 2021. The entire contents of the aforementioned application are incorporated herein by reference.

TECHNICAL FIELD

The disclosure herein generally relates to the field of mainframe based technology, and, more particularly, to a method and system for automated refactoring of mainframe based batch systems to a cloud native environment.

BACKGROUND

Every business application today has the need to be moved onto a cloud based ecosystem to manifest the architectural benefits of agility, scalability, performance etc. Various approaches have been used in the prior art to move the business applications onto the cloud. One such approach is the refactoring of the existing architecture. But these feature rich systems in production with very less or no information on the evolution of them over years make the process of refactoring complex. Due to this complexity, competency issues, effort intensiveness and the possibility of failures in this approach, enterprises choose to live with the existing legacy applications.

With respect to Mainframe or Legacy applications, to make a system cloud native it is important not only to transform the current system but also to transform the ecosystem of applications which are built in different technologies. The process of converting batch components in Mainframe, which includes but not limited to, are job control language (JCL), procedures (PROCs), Control Cards, Input VSAM Files, Generation Data Groups (GDG), Mainframe utilities, to a cloud native technology is largely a manual activity with all the above said challenges.

Mainframe batch system have various type of source components and each component has its own purpose and functionality within the environment. A solution that can understand this ecosystem and create a language independent model to represent the elements within and its dependencies is currently not existent today. The language independent model also enables the code generation to any target technology feasible.

SUMMARY

Embodiments of the present disclosure present technological improvements as solutions to one or more of the above-mentioned technical problems recognized by the inventors in conventional systems. For example, in one embodiment, a system for automated refactoring of mainframe based batch systems to a cloud native environment is provided. The system comprises a user interface, one or more hardware processors, and a memory. The user interface provides an application as an input, wherein the application comprises a plurality of components, and the application is present on the mainframe based batch systems. The memory is in communication with the one or more hardware processors, wherein the one or more first hardware processors are configured to execute programmed instructions stored in the one or more first memories, to: group the plurality of components to analyze relationships and dependency links between the plurality of the components of the mainframe based batch system; eliminate a plurality of technology dependent components present in the grouped plurality of components to create an expanded version of the plurality of components which mimics the mainframe based batch systems; create a proprietary language independent model (PLIM) using the expanded plurality of components, wherein the proprietary language independent model comprises information from the plurality of JCL components and a plurality of tags required for refactoring; identify a target technology on which the refactoring is going to be done on the cloud native environment; create a conversion of the application through externalized command based templates (ECBT), wherein the ECBT are aligned to the proprietary language independent model (PLIM) and the target technology; and combine externalized commands in the ECBTs with the proprietary language independent model, wherein the combining results in the refactoring of each of the plurality of JCL components to the target technology.

In another aspect, a method for automated refactoring of mainframe based batch systems to a cloud native environment is provided. Initially, an application is provided as an input, wherein the application comprises a plurality of components, and the application is present on the mainframe based batch systems. The plurality of components is then grouped to analyze relationships and dependency links between the plurality of the components of the mainframe based batch system. Further, a plurality of technology dependent components present in the grouped plurality of components is eliminated to create an expanded version of the plurality of components which mimics the mainframe based batch systems. In the next step, a proprietary language independent model (PLIM) is created using the expanded plurality of components, wherein the proprietary language independent model comprises information from the plurality of JCL components and a plurality of tags required for refactoring. Further, a target technology is identified on which the refactoring is going to be done on the cloud native environment. In the next step, a conversion of the application is created through externalized command based templates (ECBT), wherein the ECBT are aligned to the proprietary language independent model (PLIM) and the target technology. Finally, externalized commands are combined in the ECBTs with the proprietary language independent model, wherein the combining results in the refactoring of each of the plurality of JCL components to the target technology.

In yet another aspect, there are provided one or more non-transitory machine-readable information storage mediums comprising one or more instructions which when executed by one or more hardware processors cause automated refactoring of mainframe based batch systems to a cloud native environment. Initially, an application is provided as an input, wherein the application comprises a plurality of components, and the application is present on the mainframe based batch systems. The plurality of components is then grouped to analyze relationships and dependency links between the plurality of the components of the mainframe based batch system. Further, a plurality of technology dependent components present in the grouped plurality of components is eliminated to create an expanded version of the plurality of components which mimics the mainframe based batch systems. In the next step, a proprietary language independent model (PLIM) is created using the expanded plurality of components, wherein the proprietary language independent model comprises information from the plurality of JCL components and a plurality of tags required for refactoring. Further, a target technology is identified on which the refactoring is going to be done on the cloud native environment. In the next step, a conversion of the application is created through externalized command based templates (ECBT), wherein the ECBT are aligned to the proprietary language independent model (PLIM) and the target technology. Finally, externalized commands are combined in the ECBTs with the proprietary language independent model, wherein the combining results in the refactoring of each of the plurality of JCL components to the target technology.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
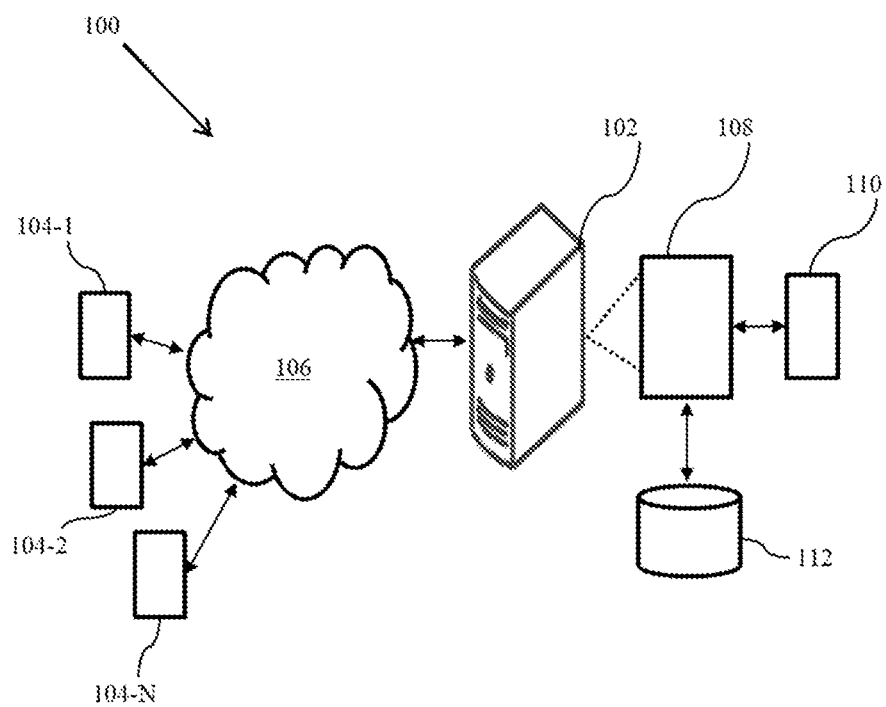
FIG. 1 illustrates a block diagram of a system for automated refactoring of mainframe based batch systems to cloud native environment according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

A Mainframe batch system have various type of source components and each component has its own purpose and functionality within the environment. A holistic refactoring approach that understands all these components together, its dependencies and role in the native environment is currently not existent. Due to this, any existing translation/refactoring are still dependent on manual skills and competency and sometimes are not attempted due to the risks of failure. A solution that can understand this ecosystem and create a language independent model to represent the elements within and its dependencies is currently not existent today.

The present disclosure provides a method and system for automated refactoring of mainframe based batch systems to cloud native environment. The present disclosure proposes an intelligent automation model that comprehends the each and every single aspect of the existing Mainframe batch system, all its inherent source elements along with its dependencies and proposes a seamless refactoring approach to translate the existing ecosystem of components to more agile, scalable, cloud native architecture.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

FIG. 1 illustrates a network diagram of a system 100 for automated refactoring of mainframe based batch systems to a cloud native environment. The system 100 of the present disclosure understands the dependencies of a plurality of source elements in the Mainframe ecosystem. With this holistic understanding of all the elements of the Mainframe batch system, it converts the information within them into a proprietary conceptual model (designed uniquely for this refactoring). This model which in-turn has all the information about the source elements is converted into the target architecture which is cloud native. The combination of the model with the externalizable command based templates (EBCT) aligns the conversion to any target technology feasible.

Although the present disclosure is explained considering that the system 100 is implemented on a server, it may also be present elsewhere such as a local machine. It may be understood that the system 100 comprises one or more computing devices 102, such as a laptop computer, a desktop computer, a notebook, a workstation, a cloud-based computing environment and the like. It will be understood that the system 100 may be accessed through one or more input/output interfaces 104-1, 104-2 . . . 104-N, collectively referred to as I/O interface 104. Examples of the I/O interface 104 may include, but are not limited to, a user interface, a portable computer, a personal digital assistant, a handheld device, a smartphone, a tablet computer, a workstation and the like. The I/O interface 104 are communicatively coupled to the system 100 through a network 106.

In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 100 through communication links.

The system 100 may be implemented in a workstation, a mainframe computer, a server, and a network server. In an embodiment, the computing device 102 further comprises one or more hardware processors 108, one or more memory 110, hereinafter referred as a memory 110 and a data repository 112, for example, a repository 112. The memory 110 is in communication with the one or more hardware processors 108, wherein the one or more hardware processors 108 are configured to execute programmed instructions stored in the memory 110, to perform various functions as explained in the later part of the disclosure. The repository 112 may store data processed, received, and generated by the system 100. The memory 110 further comprises a plurality of modules. The plurality of modules is configured to perform various functions. The plurality of modules comprises an expander 114, a scanner 116 and a target output generator 118.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

Figure 2:
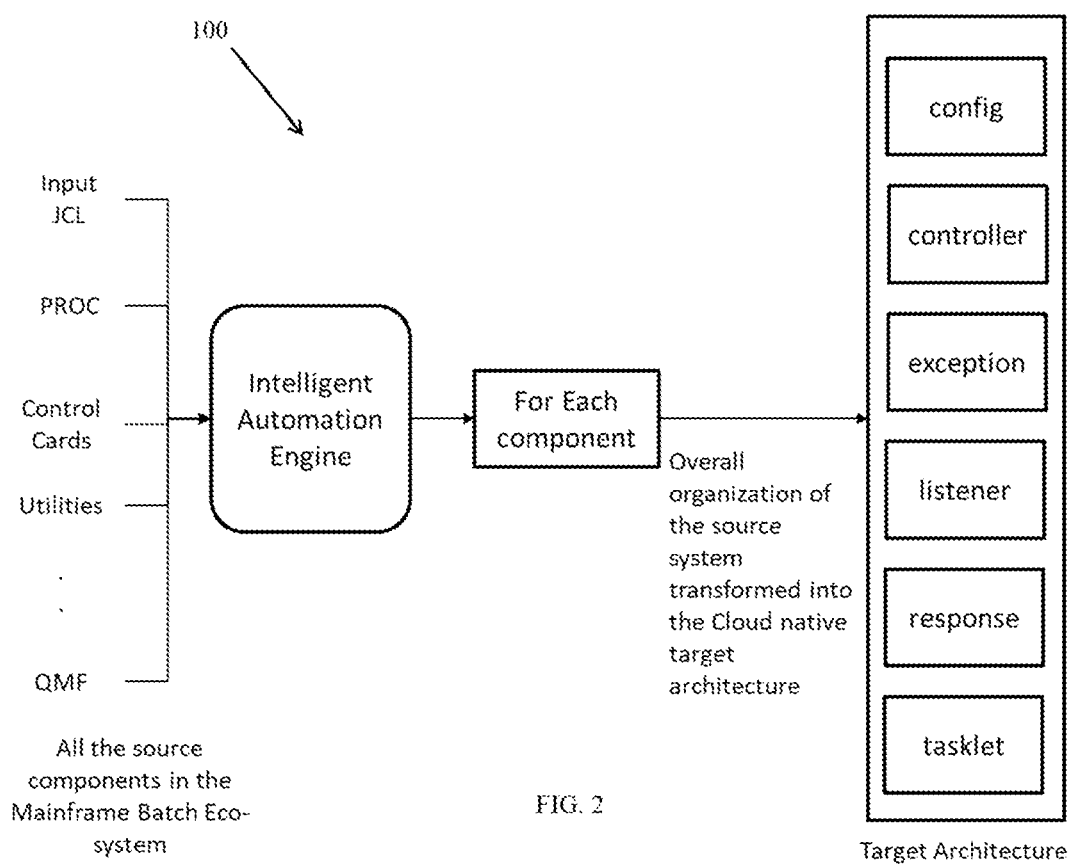
FIG. 2 is a schematic architecture of the system for automated refactoring of mainframe based batch systems to cloud native environment according to some embodiments of the present disclosure.
Figure 3:
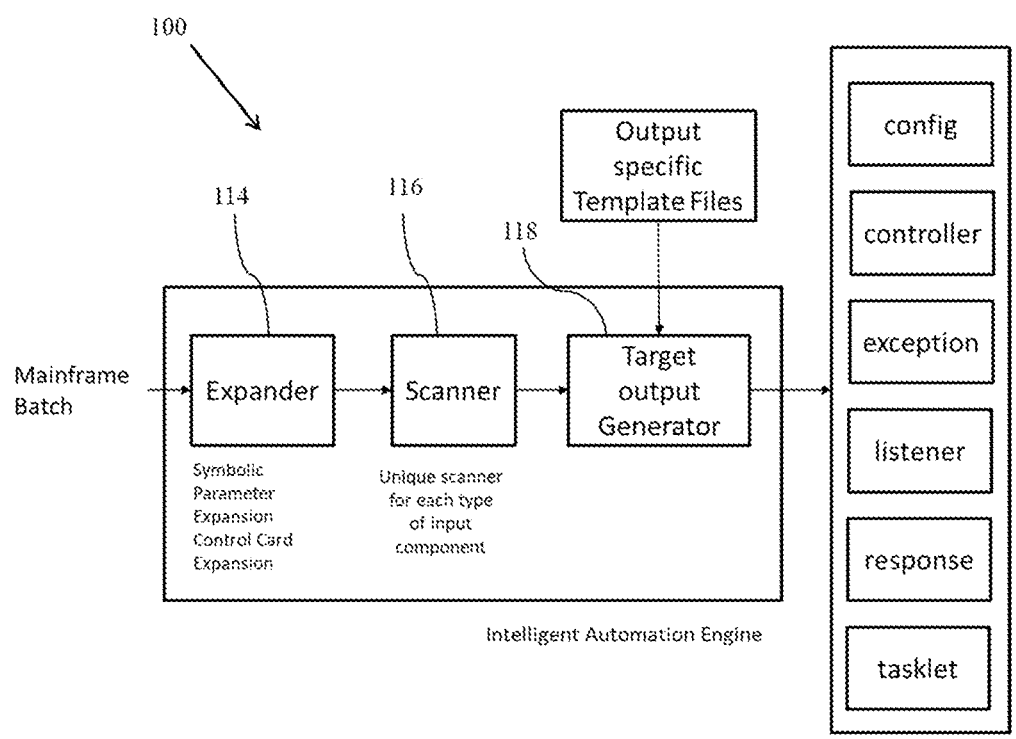
FIG. 3 is a functional block diagram of the system of FIG. 1 for automated refactoring of mainframe based batch systems to cloud native environment according to some embodiments of the present disclosure.

According to an embodiment of the disclosure, a schematic architecture and a block diagram of the system 100 for automated refactoring of mainframe based batch systems to cloud native environment shown in FIG. 2 and FIG. 3 respectively. With respect to Mainframe/Legacy applications, to make an application cloud native, it is important not only to transform the current application but also to transform the ecosystem of applications which are built in different technologies. The process of converting batch components in Mainframe, which includes but not limited to JCL, PROC, Control Cards, Input VSAM Files, Generation Data Groups (GDG), Mainframe utilities, QMF etc. to a cloud native technology is a risk intensive and time consuming activity completely dependent on the existing knowledge.

The first and foremost step in this mammoth task is to eliminate the technology dependent components in the application and convert the same to the proprietary conceptual model.

According to an embodiment of the disclosure, the system 100 is utilizing three main components, i.e., the expander 114, the scanner 116 and the target output generator 118. The expander is configured to eliminate a plurality of technology dependent components present in the grouped plurality of components to create an expanded version of the plurality of components which mimics the mainframe based batch systems. A job control language (JCL) has multiple elements to enable componentization in the Mainframe system. For instance, a) PROCs are available to hold reusable code. Some programs and tasks have a larger amount of reusable part. For jobs that run frequently or types of jobs that use the same reusable code, prepare sets of job control statements, called procedures or PROC. A PROC or a procedure library member contains only part of the JCL for a given task-usually the fixed, reusable part of JCL. The user of the procedure supplies the variable part from the JCL to the PROC for a specific job. In other words, set of job control statements that are frequently used are defined separately as a procedure and it can be invoked as many times as we need from the job.

These PROCs in-turn take up symbolic parameters which in-turn provides methods to pass runtime variables etc. The Control cards are available to provide runtime control information during a relational database utility call or a SORT utility. To create a language independent model, the first step is to eliminate these dependencies and create an expanded version of the component which mimics the process that happens in runtime. So, in this step all the PROCs are expanded with their symbolic parameters resolved. Based on the step and the usage of the control cards, —the control cards are also expanded. In the end of this expansion step, all the dependencies that exist in control cards, PROCs, and other components like QMF etc. are removed and the expanded JCL acts as the single source of information in the steps forward.

According to an embodiment of the disclosure, the system 100 comprises the scanner 116. The scanner is configured to create, a proprietary language independent model (PLIM) using the expanded plurality of components. The proprietary language independent model comprises information from the plurality of JCL components and a plurality of tags required for refactoring. The proprietary model not just holds the information from the source elements but also holds the tags that will help during the conversion.

According to an embodiment of the disclosure, the system 100 comprises the target output generator 118. Each step in the input component needs its corresponding translation to the target. Information provided below is one such example considering spring batch as the target system to be hosted in the cloud environment. The spring batch also has many components each having its own purpose. The system understands the mapping of these elements and creates an appropriate conversion. This is achieved through an externalized command based templates (ECBT) which are completely aligned to the language independent model that was created. The ECBT is made of three important elements, i.e., commands, tags and target conversion information.

For each target component, there is a separate template and each line in the template has a specific command followed by target conversion information. There are 5 types of commands as follows:

(a) [COND]-[CEND] blocks: The information present in these blocks is used in target generation only if a condition is met in the source and the condition is set in the Proprietary Language Independent Model (PLIM). For instance, the GDGFLAG is an example of a condition which is set only if the source system processes the current and the previous versions of the included datasets.

(b) [LOOP]-[LEND] blocks: The information present in these blocks take a list of elements as input from the PLIM and loop over them to create set of converted output statement in a loop (c) [GENR]: This command replaces a whole block of input that is received from the conversion logic in the corresponding template line. This command makes the template extendable to even newer scenarios and newer conversion logics.

(d) [REPL]: This command takes in the input from the PLIM and scans for the tags in the template. The tag is replaced with the information from PLIM and a new converted output line is created.

(e) [****]: There are set of information that can be taken as is to the target conversion. These lines are preceded by the above tag.

The overall innovation provides a lightweight yet robust and extensible method to understand different components within the Mainframe system and convert them to required target technology.

Figure 4:
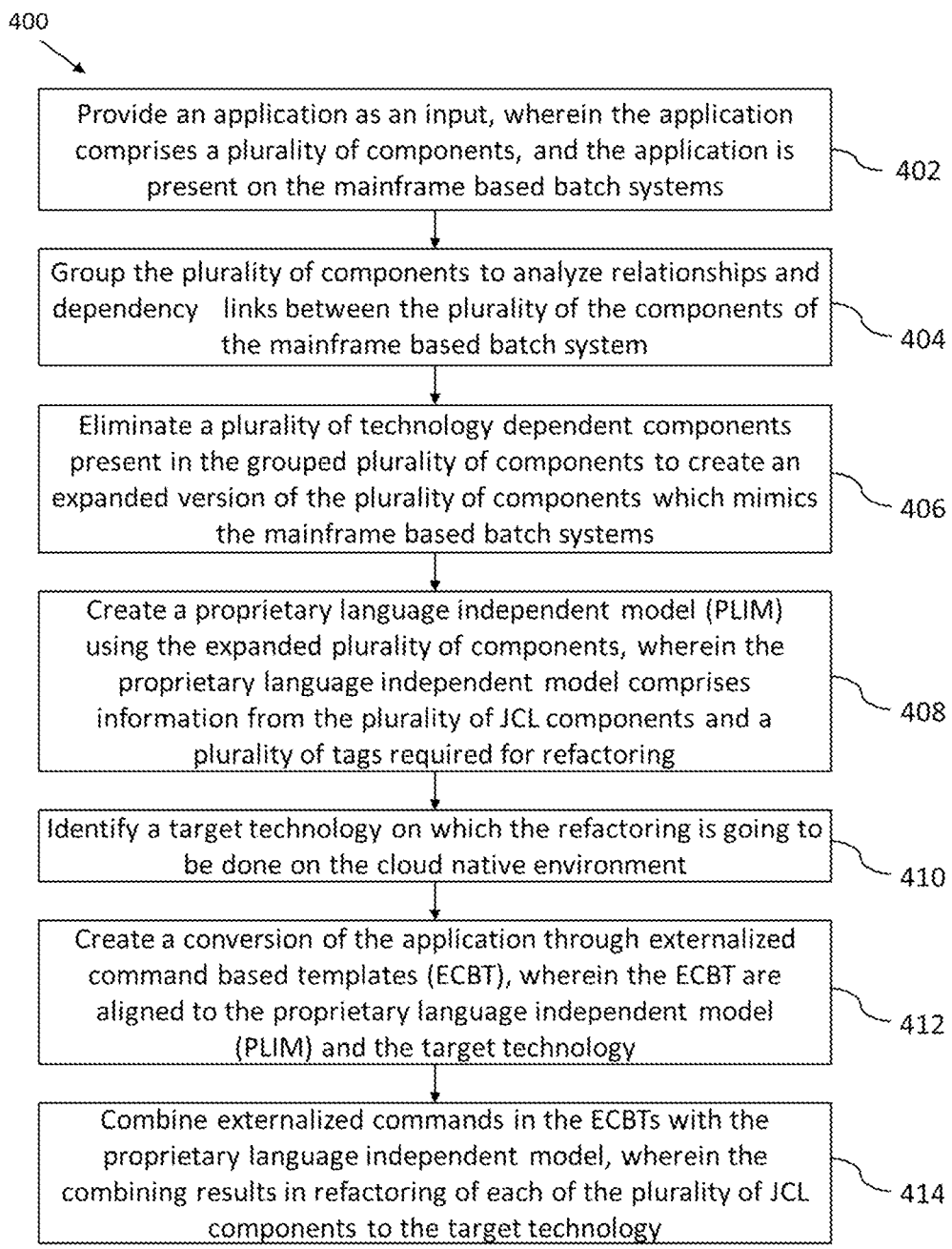
FIG. 4 is a flow chart for a method for automated refactoring of mainframe based batch systems to cloud native environment accordance with some embodiments of the present disclosure.

FIG. 4 illustrates an example flow chart of a method 400 for automated refactoring of mainframe based batch systems to a cloud native environment, in accordance with an example embodiment of the present disclosure. The method 400 depicted in the flow chart may be executed by a system, for example, the system 100 of FIG. 1. In an example embodiment, the system 100 may be embodied in a computing device.

Operations of the flowchart, and combinations of operations in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 400 are described with help of system 100. However, the operations of the method 400 can be described and/or practiced by using any other system.

Initially at step 402, an application is provided as an input via the user interface. The application comprises a plurality of components. The application is present on the mainframe based batch systems. At step 404, the plurality of components is grouped together to analyze relationships and dependency links between the plurality of the components of the mainframe based batch system. Further at step 406, the plurality of technology dependent components present in the grouped plurality of components is eliminated to create an expanded version of the plurality of components which mimics the mainframe based batch systems. The relationships and dependency between the plurality of components such as JCL, PROCS, and Control Cards etc. are resolved while creating the expanded code. Once the expanded code is created, the dependency that the system has with these individual components is removed. For example, control cards have a particular syntax which is not the same as the JCL. This would also include parts like DB2 query etc.

At step 408 of the method 400, the proprietary language independent model (PLIM) is created using the expanded plurality of components, wherein the proprietary language independent model comprises information from the plurality of JCL components and a plurality of tags required for refactoring. Further at step 410, the target technology is identified on which the refactoring is going to be done on the cloud native environment. At step 412, the conversion of the application is created through externalized command based templates (ECBT). The ECBT are aligned to the proprietary language independent model (PLIM) and the target technology. And finally, at step 414, externalized commands in the ECBTs with the proprietary language independent model, wherein the combining results in refactoring of each of the plurality of JCL components to the target technology.

While the present disclosure is currently conceptualized with Mainframe batch system comprising of JCLs and its dependent components, the Proprietary Language Independent Model, and the ECBT can also be extended to support similar systems in AS400 platform like CL Programs, and other Batch systems like UNISYS WFL.

The system 100 can also be explained with the help of few example snippets. An example snippet from the Proprietary Language Independent Model (PLIM) is shown below:

```
{JOB:"JCL1"
  STEPLIST:[
    {"STEP1":[
      "STEPNAME":
        "JOB_0001_PROC_0001_ST_01"
      "DDLIST": [
        "DDNAME":"INFILE",
        "DSN":"SYS.FILE.DSN.NAME(+1)",
        "PARAMS":[ ],
        "DCB":[ ],
        "GDGFLAG":"T",
        "QUERYFLAG":"F",
      ]
    ],
    "STEP2":}
  ]
}
```

An example snippet from the Externalized Command Based Templates is shown below. The ECBT are aligned to the language independent model that was created. The ECBT is made of three important elements, i.e., commands, tags and target conversion information.

```
[****]   import   org.springframework.batch.
    core.launch.support.RunIdIncrementer;
[****] import org.springframework.batch.core.reposito-
    ry.JobRepository;
[****] import org.springframework.batch.core.reposito-
    ry.support.JobRepositoryFactoryBean;
[****] import org.springframework.beans.factory.annota-
    tion.Autowired;
[****] import org.springframework.beans.factory.annota-
    tion.Value;
[****]   import   org.springframework.context.
    annotation.Bean;
[****]   import   org.springframework.context.
    annotation.Configuration;
[****]   import   org.springframework.context.
    annotation.PropertySource;
[****]   import   org.springframework.transaction.Plat-
    formTransactionManager;
[REPL]                                          import
    ##PACKAGEROOT##.listener.BatchListener;
[LOOP] ##STEPLIST##
[COND] ##GDGFLAG##==Y
[REPL]                                          import
    ##PACKAGEROOT##.##STEPNAME##_
    StepExecutionListener;
[GENR] ##STEPLISTENERCLASS##
[CEND]
[COND] ##CHUNKSTEP##==Y
[GENR] ##CHUNKLETCLASS##
[REPL]import
    ##PACKAGEROOT##.step.##JOBNAME##_
    ##STEPNAME##_ItemReader;
[REPL]import
    ##PACKAGEROOT##.step.##JOBNAME##_
    ##STEPNAME##_ItemWriter;
[REPL]import
##PACKAGEROOT##.model.##JOBNAME##_
    ##STEPNAME##_##MODELCLASS##;
```

Another example snippet from the Externalized Command Based Templates is shown below:

```
[****] public RepeatStatus execute (StepContribution
    contribution, ChunkContext chunkContext)
[****] SortUtility s=new SortUtility( );
[****] srcFile=srcPath+sortinFileArray [0];
[COND]##SORTTYPE##==TYPE1
```

```
[****] Comparator<String> comparator=(op1, op2)→{
[GENR] ##COMPARELOGIC##
[****] };
[****] tgtFile=tgtPath+sortOutFileArray [0];
[****] s.sortFixedLengthFile (srcFile, tgtFile, tempPath,
    comparator, 1);
[CEND]
[COND] ##SORTTYPE##==TYPE2
[****] Comparator<String> comparator=(op1, op2)→{
[GENR] ##COMPARELOGIC##
[****] };
[****] tgtFile=tgtPath+sortOutFileArray [0];
[****] s.sortUniqueFixedLengthFile (srcFile, tgtFile,
    tempPath, comparator,1);
[CEND]
[COND] ##SORTTYPE##==TYPE3
[****] Comparator<String> comparator=(op1, op2)→{
[GENR] ##COMPARELOGIC##
[****] };
[****] String tgtFile_tmp=tgtPath+sortOutFileArray [0]+
    "_tmp";
[****] tgtFile=tgtPath+sortOutFileArray [0];
```

A sample snippet from an INPUT JCL file s is shown below:

```
/STEP010 EXEC PGM=IEFBR14
/OUTFILE                                              DD
    DSN=LPGMSB.FILES.CASESTDY.DEPMOOUT,
/DISP=(MOD, DELETE),
/SPACE=(TRK, (0,0), RLSE),
/UNIT=SYSDA
/*
/SQLSTEP EXEC PGM=BKXDEPMO
/STEPLIB DD DSN=LPGMSB.CASESTDY.LOADLIB,
    DISP=SHR
/SYSTSPRT DD SYSOUT=*
/SYSOUT DD SYSOUT=*
/SYSABOUT DD SYSOUT=*
/SYSUDUMP DD SYSOUT=*
/SYSPRINT DD SYSOUT=*
/INFILE                                               DD
    DSN=LPGMSB.FILES.CASESTDY.DEPMOIN,
    DISP=SHR
/OUTFILE                                              DD
    DSN=LPGMSB.FILES.CASESTDY.DEPMOOUT,
/DISP=(NEW, CATLG, CATLG),
/UNIT=SYSDA,
/SPACE=(CYL, (1,1)),
/DCB=(DSORG=PS, RECFM=FB, LRECL=80)
/
```

Converted Java Tasklet Class—Sample Snippet is shown below:

```
[****] import org.springframework.batch.core.scope
    .context.ChunkContext;
[****] import org.springframework.batch.core.step.task-
    let.Tasklet;
[****] import org.springframework.batch.repeat.Repeat-
    Status;
[****] import org.springframework.beans.factory.annota-
    tion.Autowired;
[****] import org.springframework.beans.factory.annota-
    tion.Value;
[****] import org.springframework.jdbc.core.JdbcTem-
    plate;
[****] import org.springframework.stereotype.Compo-
    nent;
@Component
] public class RUNDEPMO_SQLSTEP_TASKLET
    implements Tasklet {
private static final Logger
    logger=LoggerFactory.getLogger         (RUNDEP-
    MO_SQLSTEP_TASKLET class);
@Override
] public RepeatStatus execute (StepContribution contri-
    bution, ChunkContext chunkContext) throws Except
    logger.info ("{0} has been executed on thread {1}",
    chunkContext.getStepContext ( ).getStepName ( ),
    Thread.currentThread ( ).getName ( ));
JobParameters
    parameters=chunkContext.getStepContext ( ).get-
    StepExecution ( ).getJobParameters ( );
ExecuteProgramUtilites       objExecPgm=new
    ExecuteProgramUtilites ( );
objExecPgm.executeProgram ("BKXDEPMO", null);
return RepeatStatus.Finished;
    }
}
```

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The disclosure herein addresses unresolved problem related to creating a language independent model which can enable the code generation to any target technology feasible. The embodiment thus provides the method and system for automated refactoring of mainframe based batch systems to a cloud native environment.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs etc.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A method for automated refactoring of mainframe based batch systems to a cloud native environment, the method executed by one or more hardware processors comprising:
    creating an expanded version of an application present on the mainframe based batch systems, the application comprising at least one group of a plurality of components of the mainframe based batch systems having relationships and dependency links between the plurality of components, wherein the expanded version mimics the mainframe based batch systems and is based on a plurality of technology dependent components present in the at least one group;
    creating a proprietary language independent model (PLIM) using the expanded version, wherein the PLIM comprises information from a plurality of job control language (JCL) components and a plurality of tags required for the automated refactoring;
    creating a conversion of the application through externalized command based templates (ECBTs), wherein the ECBTs are aligned to the PLIM and a target technology on which the automated refactoring is going to be performed on the cloud native environment; and
    combining externalized commands in the ECBTs with the PLIM, wherein the combining results in the automated refactoring of each of the plurality of JCL components to the target technology.

2. The method of claim 1, wherein the target technology comprises one of a Spring batch project or a cloud based batch system.

3. The method of claim 1, wherein the expanded version comprises a plurality of syntactical forms from the plurality of components, wherein the plurality of components is processed with unified proprietary parsing techniques to create the PLIM, and wherein the PLIM is configured to capture information from source components that is required for the automated refactoring.

4. The method of claim 1, wherein the plurality of components comprises a plurality of JCL components, JCL procedures, control cards, Query Management Files (QMFs), Virtual Storage Access Method (VSAM) files, and batch utilities.

5. The method of claim 1, wherein each ECBT is made of commands, the plurality of tags, and target conversion information.

6. A system for automated refactoring of mainframe based batch systems to a cloud native environment, the system comprising:
    a user interface for providing an application as an input, wherein the application comprises at least one group of a plurality of components of the mainframe based batch systems having relationships and dependency links between the plurality of components, and wherein the application is present on the mainframe based batch systems;
    one or more hardware processors;
    a memory in communication with the one or more hardware processors, wherein the one or more first hardware processors are configured to execute programmed instructions stored in the memory to:
        create an expanded version of the application which mimics the mainframe based batch systems, wherein the expanded version is based on a plurality of technology dependent components present in the at least one group;
        create a proprietary language independent model (PLIM) using the expanded version, wherein the PLIM comprises information from a plurality of job control language (JCL) components and a plurality of tags required for the automated refactoring;
        create a conversion of the application through externalized command based templates (ECBTs), wherein the ECBTs are aligned to the PLIM and a target technology on which the automated refactoring is going to be performed on the cloud native environment; and
        combine externalized commands in the ECBTs with the PLIM, wherein the combining results in the automated refactoring of each of the plurality of JCL components to the target technology.

7. The system of claim 6, wherein the target technology comprises one of a Spring batch project or a cloud based batch system.

8. The system of claim 6, wherein the expanded version comprises a plurality of syntactical forms from the plurality of components, wherein the plurality of components is processed with unified proprietary parsing techniques to create the PLIM, and wherein the PLIM is configured to capture information from source components that is required for the automated refactoring.

9. The system of claim 6, wherein the plurality of components comprises a plurality of JCL components, JCL procedures, control cards, Query Management Files (QMFs), Virtual Storage Access Method (VSAM) files and batch utilities.

10. The system of claim 6, wherein each ECBT is made of commands, the plurality of tags, and target conversion information.

11. One or more non-transitory machine-readable information storage mediums comprising one or more instructions which when executed by one or more hardware processors execute a method for automated refactoring of mainframe based batch systems to a cloud native environment comprising:
   creating an expanded version of an application present on the mainframe based batch systems, the application comprising at least one group of a plurality of components of the mainframe based batch systems having relationships and dependency links between the plurality of components, wherein the expanded version mimics the mainframe based batch systems and is based on a plurality of technology dependent components present in the at least one group;
   creating a proprietary language independent model (PLIM) using the expanded version, wherein the PLIM comprises information from a plurality of job control language (JCL) components and a plurality of tags required for the automated refactoring;
   creating a conversion of the application through externalized command based templates (ECBTs), wherein the ECBTs are aligned to the PLIM and a target technology on which the automated refactoring is going to be performed on the cloud native environment; and
   combining externalized commands in the ECBTs with the PLIM, wherein the combining results in the automated refactoring of each of the plurality of JCL components to the target technology.

12. The one or more non-transitory machine-readable information storage mediums of claim 11, wherein the technology comprises one of a Spring batch project or a cloud based batch system.

13. The one or more non-transitory machine-readable information storage mediums of claim 11, wherein the expanded version comprises a plurality of syntactical forms from the plurality of components, wherein the plurality of components is processed with unified proprietary parsing techniques to create the PLIM, and wherein the PLIM is configured to capture information from source components that is required for the automated refactoring.

14. The one or more non-transitory machine-readable information storage mediums of claim 11, wherein the plurality of components comprises a plurality of JCL components, JCL procedures, control cards, Query Management Files (QMFs), Virtual Storage Access Method (VSAM) files and batch utilities.

15. The one or more non-transitory machine-readable information storage mediums of claim 11, wherein each ECBT is made of commands, the plurality of tags, and target conversion information.

* * * * *